Nov. 12, 1929.  G. F. YAGER  1,734,989
CHUCK FOR BUSHINGS
Filed Oct. 10, 1927
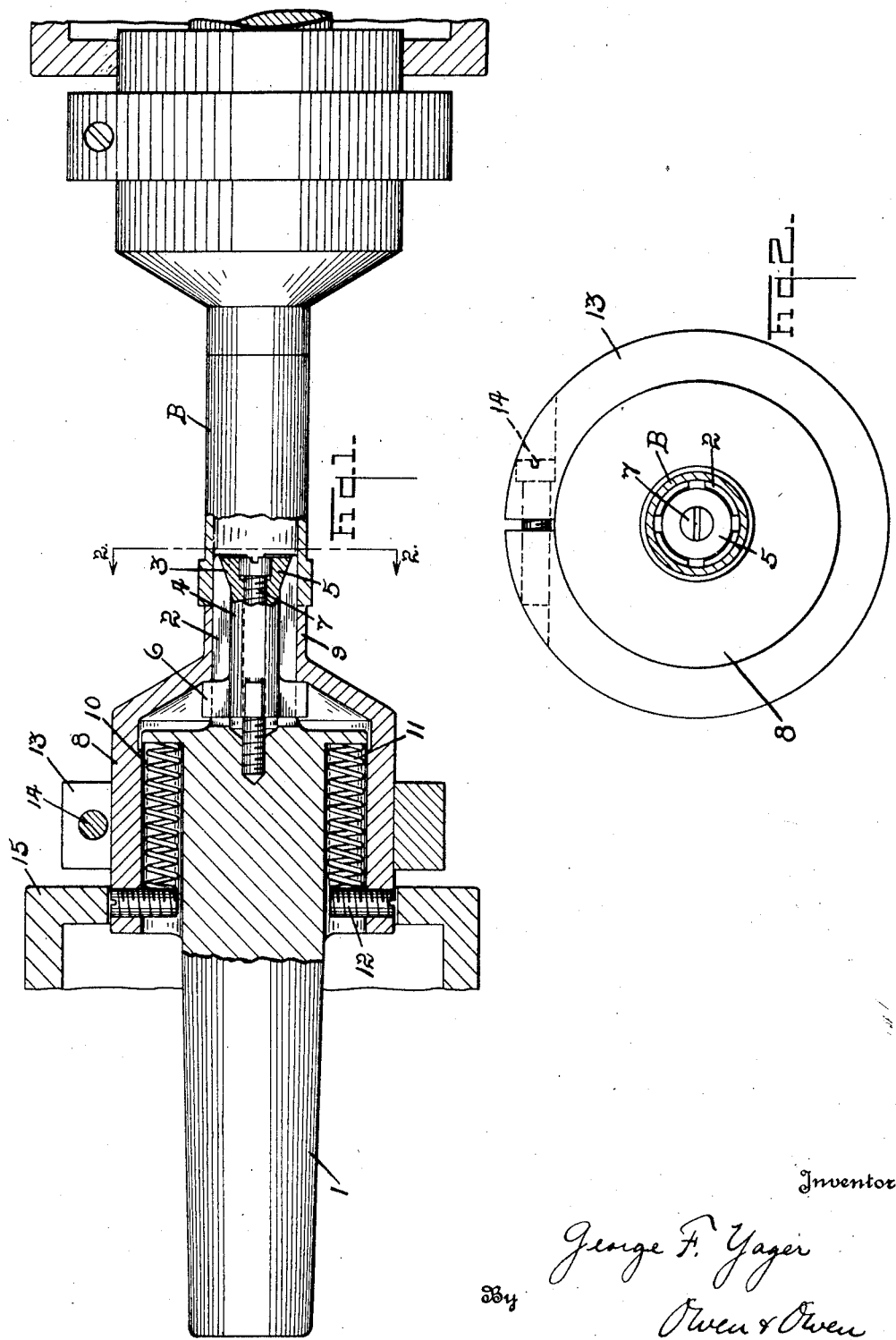
Inventor
George F. Yager
By Owen & Owen
Attorneys Patented Nov. 12, 1929

1,734,989

UNITED STATES PATENT OFFICE

GEORGE F. YAGER, OF TOLEDO, OHIO, ASSIGNOR TO THE BUNTING BRASS & BRONZE COMPANY, OF TOLEDO, OHIO, A CORPORATION OF OHIO

CHUCK FOR BUSHINGS

Application filed October 10, 1927. Serial No. 225,144.

This invention relates to chucks, but particularly to chucks for bushings having relatively thin walls which are liable to become distorted from the application of any great amount of force.

An object of this invention is to provide a chuck for bushings adapted to engage the inside thereof for centering the same and to exert an endwise driving force of considerably greater force than the means centering the bushings so as to avoid distortion of the metal, and at the same time providing a most satisfactory and efficient holding and driving means. A further object is to produce a chuck having the new and improved features of construction and arrangement hereinafter described.

The invention is shown by way of illustration in the accompanying drawings in which:

Fig. 1 is an elevation partly in section of a portion of a turning machine sufficient to illustrate the invention; and Fig. 2 is a section on the line 2—2 of Fig. 1.

Referring to the drawings the chuck comprises an arbor 1 having a tapered shank for driving engagement with a spindle which may be horizontally reciprocated, as is well understood in turning machines for bushings and similar articles. The outer end of the arbor 1 is considerably reduced to receive a bushing B, and is formed with relatively long expansible fingers 2 having internal outwardly tapered cam surfaces 3. It is apparent that the fingers extend into the bushing B, and may be expanded into engagement with the walls thereof for accurately centering the same.

For forcing the fingers 2 outwardly into engagement with the bushing B, an expander 4 is disposed between the fingers and is formed with tapered head 5 engageable with the cam surfaces 3 for wedging the fingers outwardly. The expander 4 has a shank and lugs 6 radiate from the expander shank at intervals from the inner end portion. A screw 7 on which the expander has limited sliding movement extends therethrough, and is screwed into the arbor 1.

Fitting over the arbor 1 is a sleeve 8 provided with a reduced extension 9 which slidably engages the expansible fingers 2, it being observed that the extension 9 is considerably shorter than the fingers 2 to provide sufficient room to receive a bushing. The end of the extension 9 engages the end of the bushing B and exerts pressure thereagainst for creating sufficient friction to drive the bushing.

The arbor is enlarged adjacent the fingers 2 to provide sockets 10 to receive coil springs 11 which have their outer ends abutting against screws 12 carried by the sleeve 8. It is apparent that the pins 12 not only provide an abutment for the springs 11, but also prevent relative turning movement between the sleeve 8 and arbor 1.

Surrounding the sleeve 8 is a split collar 13 which is secured in adjusted position by a screw 14. The collar 13 may be moved to any desired position along the sleeve 8, depending upon the stroke of the arbor and point at which the bushing is to be released. The collar 13 is engaged by a fixed abutment 15 which may be part of the machine frame. These parts are brought into engagement when the arbor is retracting, and operates to check the movement of the sleeve 8, thereby permitting the fingers 2 to withdraw for releasing and discharging the bushing.

In operation, it is apparent that the fingers 2 extend inside of the bushing B, and are extended to properly center the bushing. The extension or expansion of the fingers is caused by the lugs 6 abutting against the sleeve 8 and consequent wedging of the head 5 against the taper surfaces 3. End pressure is exerted on the bushing by the sleeve 8, and this pressure is considerably greater than the extending or expanding pressure of the fingers 2, so that liability of distorting the walls of the bushing B is materially reduced. As above explained, when the arbor retracts (moves to the left, Fig. 1) the collar 13 comes in contact with the frame 15 and causes the release of the bushing.

Similar chucks are shown in the drawings on opposite sides of the bushing B, and although this is a very satisfactory manner of operating the bushing, it is not necessary because another chuck might be used with the chuck above described. I therefore do not desire to restrict the invention to such combination nor to the arrangement shown on the drawing, because other arrangements may be resorted to without departing from the purview of the invention. It is further to be understood that the above description is given by way of illustration and not of limitation, and other changes in details of construction and arrangement may be effected without departing from the invention, as defined in the following claims.

What I claim as new and desire to secure by Letters Patent is:

1. In a device of the class described, an arbor having expansible fingers projecting from an end thereof and adapted to extend into a bushing for centering the same, an expander member within said fingers for spreading the same, a sleeve forming an abutment for said expander and having a reduced extension slidable on said fingers, means to prevent turning of the sleeve relatively to said arbor, said reduced extension being adapted to exert end pressure on the bushing for rotating thereof.

2. In a device of the class described, a chuck having expansible fingers for engaging the inside of a bushing to center the same, means to expand said fingers, rotatable means to exert an end pressure on the bushing, and means to cause relative movement of said fingers and said rotatable means to eject the bushing therefrom.

3. In a device of the class described, a rotatable and reciprocable arbor, means extensible inside a bushing and adjustable to center a bushing, a sleeve fitting over said centering means for exerting an end pressure on the bushing, an abutment for the opposite end of the bushing, and means to release said centering means.

4. In a device of the class described, a rotatable and reciprocable arbor, means extensible inside a bushing and adjustable to center a bushing, a sleeve fitting over said centering means for exerting an end pressure on the bushing, an abutment for the opposite end of the bushing, a collar adjustable on said sleeve, and a fixed abutment against which said collar strikes for arresting the movement of said sleeve, thereby to release the bushing.

5. In a device of the class described, a rotatable and reciprocable arbor, expansible means on said arbor to project into a bushing for centering the same, means to create an end pressure of greater force than the force of said expansible means, and means to release the bushing from said expansible means.

In testimony whereof I have hereunto signed my name to this specification.

GEORGE F. YAGER.